Dec. 15, 1925.
A. J. OSTBERG
1,565,813
PNEUMATIC RESILIENT TUBE, A PLASTIC COMPOSITION
COMBINED THEREWITH AND PROCESS OF MANUFACTURE
Filed May 12, 1922
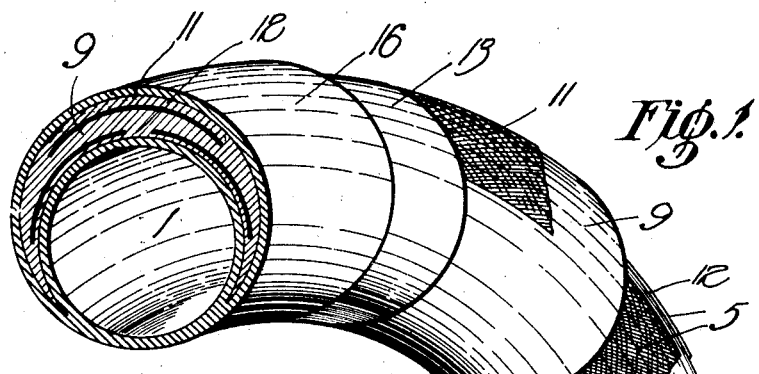
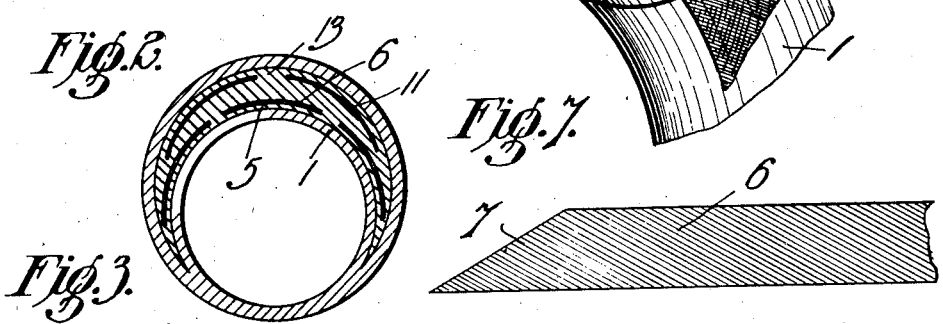
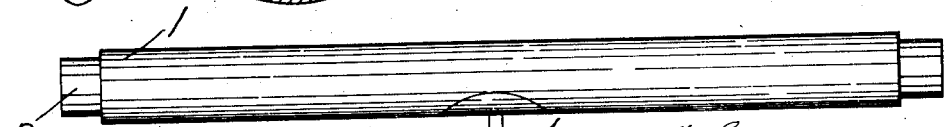
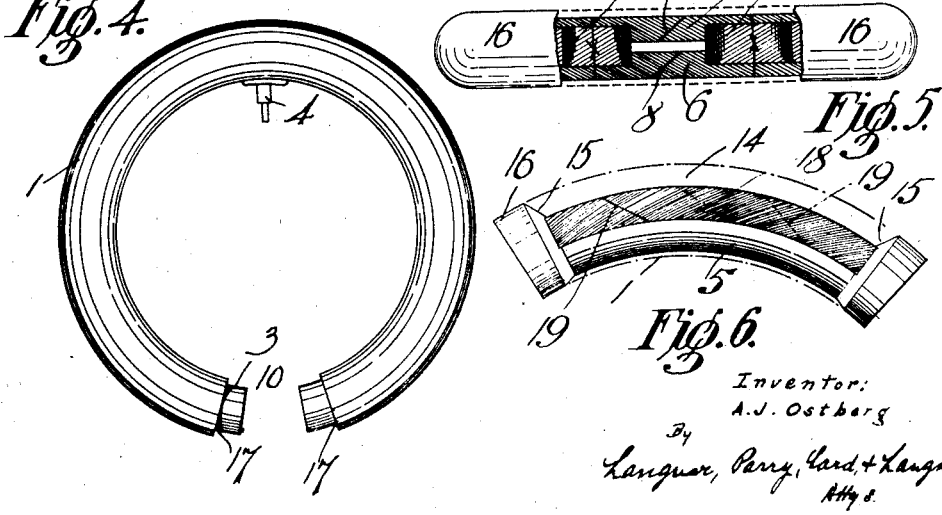
Inventor:
A. J. Ostberg
By
Langner, Parry, Card & Langner
Attys Patented Dec. 15, 1925.

1,565,813

UNITED STATES PATENT OFFICE.

ANDERS JOHN OSTBERG, OF EAST ST. KILDA, NEAR MELBOURNE, VICTORIA, AUSTRALIA.

PNEUMATIC RESILIENT TUBE, A PLASTIC COMPOSITION COMBINED THEREWITH, AND PROCESS OF MANUFACTURE.

Application filed May 12, 1922. Serial No. 560,423.

*To all whom it may concern:*

Be it known that ANDERS JOHN OSTBERG, a citizen of the Commonwealth of Australia, and resident of "Glenfern", corner Hotham and Inkerman Streets, East St. Kilda, near Melbourne, in the State of Victoria, Commonwealth of Australia, has invented a new and useful Improved Pneumatic Resilient Tube, a Plastic Composition Combined Therewith, and Process of Manufacture, of which the following is a specification.

This invention relates to an improved pneumatic or resilient tube, a plastic composition combined therewith and in the process of manufacturing such completed tube.

The tubes at present in use are defective for the reason that no provision is made for the prevention of blowouts or punctures with the consequent risk of injury when such condition occurs.

This invention has been devised in order to overcome these defects and to provide an inner tube wherein the risk of punctures and blow-outs are reduced to a minimum, thus a tube is provided of greater utility than those at present in use.

An essential feature embodied in this invention consists in a tube comprising an inner and outer tube of rubber, interposing an adhesive plastic rubber composition between the rubber tubes, and building one, two or more layers of canvas fabric or other material between the layers of plastic composition, the fabric being arranged peripherally so that the edges of the outer fabric strips are spaced from but overlap the edges of the inner canvas strips, the canvas strips being so disposed that lateral expansion is given to the tube at all points of its surface.

A further essential feature consists in the interposition between an inner and outer tube, substantially thick at the tread surface, of a plastic rubber adhesive composition within which is disposed a plurality of overlapping tapes, of canvas fabric or other material, arranged peripherally of the tube, the tapes being capable of free movement in relation to each other in the plastic composition without affecting the overlap of the edges of the tapes.

A further essential feature embodied in the invention comprises a plastic rubber composition disposed between the inner and outer rubber covers comprising an admixture of masticated rubber, Canadian balsam, petroleum jelly and Manila eleme.

The preferred formulæ of this composition preferably consists in using rubber as a base and the rubber is well masticated in a rubber mill and when sufficiently soft, the proportions of other ingredients to every 5 lbs. of masticated rubber, being one ounce of Canadian balsam which has the property of being adhesive to rubber, four ounces of petroleum jelly which will keep the masticated rubber soft in cold temperatures, half ounce of Manila eleme which as a gum has the property of remaining in a consistent plastic condition and will impart such property to the rubber, and after these ingredients are mixed together the composition is ready for use.

In a precise construction and arrangement of the improved tube a layer of rubber is first formed around a metal core or tube, a strip of plastic composition is then laid around or partially around the inner layer of rubber, and then two or more strips of canvas spaced from each other, and arranged peripherally, are then laid on the plastic layer. A further layer of plastic rubber is then laid on the canvas strips and a further layer comprising a canvas strip or strips is then disposed peripherally so as to cover or overlap the adjacent edges of the inner canvas layer after which a finishing layer of plastic composition is provided and then an outer cover of rubber forming the tube which is substantially thick at the tread, the canvas or like strips running entirely around and within the periphery of the plastic layers and the shape so formed is subjected to vulcanizing.

But in order that the invention may be more readily understood, it will now be described with reference to the accompanying drawings in which:—

Figure 1 is a perspective view illustrating my improved tube and showing the respective layers as well as a cross section.

Figure 2 is a cross section of a modified tube.

Figure 3 is a view in side elevation of the first rubber layer moulded on a straight mandrel or form.

Figure 4 is a view in side elevation of the first rubber layer moulded on a circular form.

Figure 5 is a view in plan of the tube showing the steps preparatory to completing the final layers of canvas.

Figure 6 is a view in elevation illustrating the method of affixing the ends of the outer layer of canvas strips preparatory to completing the final coverings of plastic composition and rubber.

Figure 7 is a view in plan illustrating the bias or cut of the canvas or fabric strips so as to allow of lateral expansion in the completed tube.

According to this invention and the preferred manner of manufacture a layer 1 of rubber is placed around the mandrel or form 2 or 3 and is wrapped by canvas and semi-cured, after which the canvas is removed and in this step the layer 1 is covered with solution to receive the first layer of plastic composition hereinafter described.

In this step a space 10 is left between the ends of the layer and a valve connection 4 is fitted to the rubber layer 1 and the first layer 5 of plastic adhesive composition is formed upon which canvas strips 6 are then arranged with the ends 7 preferably cut diagonally so that when in position they abut as illustrated at 8, Figure 5, or alternatively, the ends 7 may overlap each other if so desired to make an air-tight joint when the tube is completed. These canvas strips 6 are suitably spaced from each other and are arranged peripherally of the tube form, but are not joined until the other steps in the process of manufacture are partially completed.

A further and heavier layer 9 of plastic rubber composition is laid over the first rubber layer 5 but the ends are not joined being distanced as at 14, Figure 6, a space being left between the ends of the plastic layers.

The canvas strip or strips 11 is or are then laid over and peripherally around the second plastic layer 9 being disposed so that it covers the space 12 between the strips 6 of the first canvas layer 6 but it will be understood that a substantial thickness of plastic rubber composition 9 is between the first canvas layer 6 and the second canvas layer 11 the canvas layers being formed of peripheral strips as above described.

The said plastic composition layer 9 is embodied to facilitate or increase the expansible qualities of the tube.

The canvas strips 11 of the second layer are tied back in any suitable way in order to allow of free working and finishing.

A further layer 13 of plastic rubber composition is then formed with a space 14 between the ends 15 while a final layer 16 of rubber to form a cover is provided with the space 15 between its ends.

The tube form is then removed from the mandrel 2 or form 3 and the ends of the inner rubber layer 1 are joined in the usual way preferably by telescoping and solutioning the ends 17. A small quantity of air is then fed to the tube form through the valve 4 and the inner plastic layer is completed and the ends of the inner layer of canvas strips 4 are then joined so as to abut as at 18 and as illustrated in Figure 6, or overlap as above mentioned.

The space between the ends of the intermediate plastic layer 9 is then filled with plastic rubber composition of the same thickness as the said layer 9 and the ends of the canvas strip 11 is then arranged in position the one end overlapping the opposite end of the strip where they meet as illustrated at 19 Figure 6.

After finishing the ends of the canvas strip 11 the space 14 on the outer plastic composition layer 13 and then the outer cover layer 16 between the ends 15 is then filled up with plastic composition and rubber respectively.

The formed tube is then placed in the mould and the mould sections fastened down the tube being blown up through the valve 4 to 45 lbs. air pressure and is then subjected to vulcanization in the usual way, and the completed tube in cross section is formed in the manner illustrated in Figure 1.

Preferably the canvas or fabric strips 6, 11 are cut on the bias as illustrated in Figure 7, that is, with the strands in diagonal line so allowing of lateral expansion in the tube which is an essential characteristic embodied in the invention, it being a feature of the invention that not only do the canvas strips expand but the composition between each strip also expands, thus expansion takes place at every part of the tube, the composition between the canvas strips having a relatively greater expansion than the canvas strips.

In the construction and as clearly illustrated it is preferred that a substantial thickness of plastic composition is arranged between the inner and outer layers of canvas strips.

It has been found in practice that an overlay of one-half inch between the inner fabric strips 6 and the outer strips 11 is sufficient to accomplish the object of the invention as the overlay of canvas will be sufficient to maintain an overlay irrespective of the amount of expansion given to the tube so that there will always be a continuity of canvas in cross section of the tube, and a further function of the canvas strips lies in the fact that they act as a support and hold the plastic layers in position.

In the construction illustrated in Figure 2 the inner canvas layer comprises three canvas strips 6 and the outer canvas layer 11 two strips, and it will be obvious that any suitable number of peripheral strips may be employed provided they perform the functions above described.

A tube constructed as above described will be of great utility as the risk of punctures and of blow-outs will be obviated, lateral expansion is given to the tube and the canvas strips formed therein so providing a tube of great strength without reducing its flexibility and various improvements and modifications may be embodied without departing from the spirit and scope of the invention, for instance, more than two layers of canvas strips disposed in the manner above described may be employed, if required, and I desire it to be understood that the term fabric may include Hessian or other material capable of performing the same function, while the arrangement of plastic layers may extend either around the tread portion or completely around the tube if so desired and in the latter case, the fabric strips would be continued around the tube in the manner above described.

What I claim as my invention and desire to secure by Letters Patent is—

1. A method of manufacture of pneumatic tubes consisting in first forming a layer of semi-cured rubber on a mandrel forming a layer of plastic adhesive composition thereon arranging a layer of spaced peripheral fabric strips on said layer forming a further layer of composition with a space between the ends, arranging a further layer of spaced peripheral fabric strips on the last said layer the fabric strips being so disposed that they cover the spaces between and overlap the edges of the inner layer of fabric strips, the ends of the outer layer of fabric strips being tied back to allow of finishing, forming a further plastic composition layer and then an outer rubber layer with a space between the ends to allow of the completion of the ends of the inner plastic layers and the outer fabric layer, overlapping the ends of the outer fabric strips, completing the outer plastic layer and then the outer rubber layer and subjecting the formed tube to vulcanization.

2. A method of manufacture of a pneumatic tube consisting of first wrapping a layer of rubber on a mandrel, then semi-curing the same mounting a valve fitting on said rubber layer forming a layer of adhesive plastic composition and then arranging a layer of spaced peripheral fabric strips thereon forming a second layer of plastic rubber composition with a space between the ends, arranging a further layer of spaced peripheral fabric strips on said second plastic layer the fabric strips being so disposed that they cover the space between and overlap the edges of the inner layer of fabric strips the ends of the outer layer of fabric strips being tied back to allow of finishing, forming an outer plastic layer and then an outer rubber layer with a space between the ends of each layer to allow of the completion of the ends of the outer canvas or like strips, removing the tube shape from the mandrel then joining the ends of the inner rubber layer partly inflating the same by pumping a small quantity of air therein completing the inner plastic layer completing the inner layer of fabric completing the intermediate plastic layer then the outer fabric strips, then the outer plastic layer and then outer rubber layer and then placing the form in the mould inflating the same to approximately 45 lb. pressure and subjecting the formed tube to vulcanization.

3. A pneumatic tube comprising inner plastic layers of an admixture of masticated rubber Canadian balsam, petroleum jelly and Manila eleme, a layer of fabric strips spaced from each other and arranged peripherally of the tube an outer layer of peripheral and spaced fabric strips spaced from and overlapping the adjacent edges of the strips of the inner fabric layer and an inner and an outer layer of rubber to form covers.

Signed at Melbourne, Victoria, Australia, this 23rd day of February 1922.

ANDERS JOHN OSTBERG.